United States Patent

[11] 3,621,867

| [72] | Inventor | John Leslie Johnson |
| | | Morrissville, N.C. |
| [21] | Appl. No. | 55,757 |
| [22] | Filed | July 17, 1970 |
| [45] | Patented | Nov. 23, 1971 |
| [73] | Assignee | Scovill Manufacturing Company |
| | | Waterbury, Conn. |

[54] AIR LINE PRESSURE REGULATOR
3 Claims, 5 Drawing Figs.

[52] U.S. Cl. ............................................. 137/116.5,
137/505.18, 137/505.42, 137/484.8
[51] Int. Cl. ............................................. F16k 17/02
[50] Field of Search............................................. 137/116.5,
505.18, 505.37, 509.42, 484.8; 251/282, 181

[56] References Cited
UNITED STATES PATENTS

| 3,204,657 | 9/1965 | Boyd | 137/505.18 X |
| 2,920,859 | 1/1960 | Holmes | 251/282 |
| 3,269,696 | 8/1966 | Norton | 251/181 |
| 1,561,867 | 11/1925 | Larsen | 251/181 |
| 2,313,564 | 3/1943 | Manly | 137/505.42 X |
| 2,994,334 | 8/1961 | Loveless | 137/116.5 X |

Primary Examiner—Harold W. Weakley
Attorney—Dallett Hoopes

ABSTRACT: A pressure regulator has its valve member balanced with downstream pressure working on both sides. A novel leak path through the valve member enables downstream air to reach the other side and incorporates a valve stem having an enlarged portion with a flat side seated on a funnel-shaped opening in the valve member.

INVENTOR
John L. Johnson
BY Dallett Hoopes
ATTORNEY

PATENTED NOV 23 1971 3,621,867

INVENTOR
John L. Johnson
BY Dallett Hoopes
ATTORNEY

AIR LINE PRESSURE REGULATOR

This invention relates to an air line pressure regulator. More specifically, this invention relates to a pressure regulator in which the valve member is balanced by the downstream air pressure. The device is an improvement over prior structures by having an improved valve stem head connection assuring a firm holding and an open leak path.

The prior art is replete with pressure regulator valve structures, some of which, such as the Hanson et al. structure shown in U.S. Pat. No. 3,282,285, having a valve member exposed to downstream pressure on both sides for balancing. Communication in the Hanson valve of the downstream pressure to the underside of the valve member is achieved by a leak path resulting from a loose fit between the valve stem and the valve member.

In prior devices, the loose fit between such members has permitted some lateral movement of the top of the stem to permit accurate seating at the top of the stem on the safety relief opening in the diaphragm. Such a loose fit, however, has also involved some lengthwise looseness which has impaired the accuracy in function of the valve, and has caused, for instance, slowness in the operating valve when the downstream pressure drops. Also, such prior devices have not readily lent themselves to replacement of the valve gasket and easy disassembly. Then, too, the leak path in prior devices has, because of the shapes of the parts, invited cloggage by dirt and other foreign bodies.

The present invention is concerned with a novel stem and valve member in such a valve and which affords a connection firm enough to provide accurate valve operation while permitting some lateral movement. It also provides a virtually uncloggable leak path and ready disassembly.

Other objects of the invention will be apparent from the following specification and the drawings which disclose a nonlimiting assembly embodying the invention.

Figure 2:
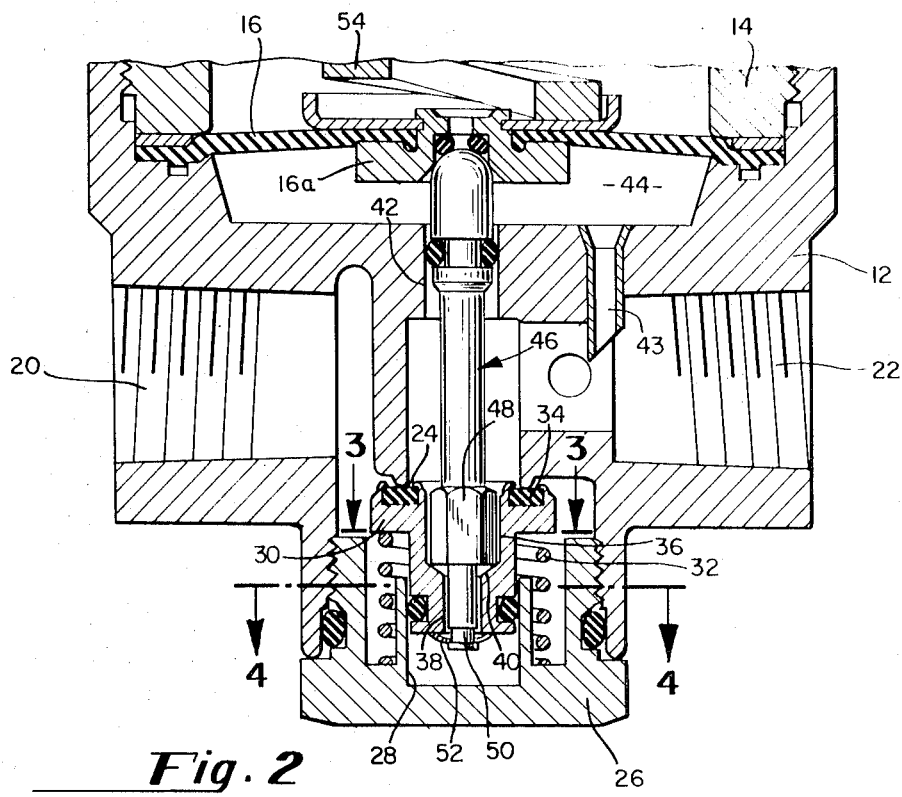
FIG. 2 is an enlarged fragmentary sectional view of the lower end of such a valve.
Figure 1:
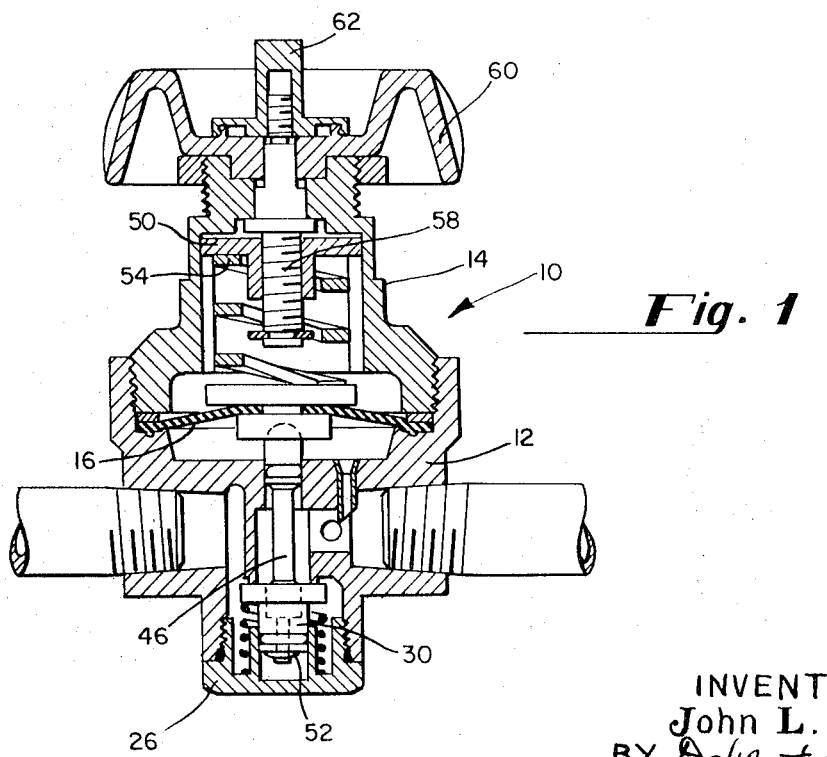
FIG. 1 is a sectional view of a valve embodying the invention installed in an air line.

Referring more specifically to the drawings, an air line pressure regulator valve embodying the invention is generally designated 10 in FIG. 1. It comprises a bottom housing 12 to which is threadedly attached a bonnet 14. Clamped between the bottom housing and the bonnet is the rim of a diaphragm member 16 which has a safety pressure relief opening 18 therein (FIG. 2).

An inlet 20 is disposed at one side of the housing while an outlet 22 is disposed at the other. The outlet passage terminates inside the housing in a downwardly facing annular seat 24. A backcap 26 is screwed into an opening in the lower end of the housing as shown and presents an upward annular central guide 28.

A valve member 30, or head, is disposed inside the housing and the lower end of the member is pistonlike and is reciprocal in the guide 28 thereby defining a sealed chamber. A spring 32 biases the valve member upwardly. The upper end of the valve member 30 is formed with an annular gasket 34 which seats on seat 24.

As shown, the valve member has a central bore with a relatively large circular upper portion 36, a smaller lower portion 38, and a tapering intermediate portion 40. As shown in FIG. 2, an opening 42 is disposed in a horizontal wall of the housing. A sensing tube 43 communicates the outlet 22 with the diaphragm chamber 44.

A valve stem pin 46 is firmly connected to the valve member 30 and comprises an enlarged hexagonal portion 48 which fits into the upper portion 36 of the bore and seats on the tapered portion 40. The valve stem pin extends through the smaller portion 38 of the valve member bore and terminates under the valve member in a portion which carries a circumferential groove 50 spaced upward from its end. A bowed "E"-ring 52 engages in the groove 50 and forms a springhead engaging the underside of the valve member to hold the stem pin 46 to the valve member.

As shown, the upper end of the stem pin 46 extends through an opening 42 and normally seats against the safety outlet 18.

The diaphragm 16 is urged downward by the regulator spring 54 which in turn is pressed downward by a spring guide 56 vertically adjustable by the nonrising screw 58 rotatable by the handwheel 60. A conventional locking clamp 62 holds the handwheel where it is set.

Figure 5:
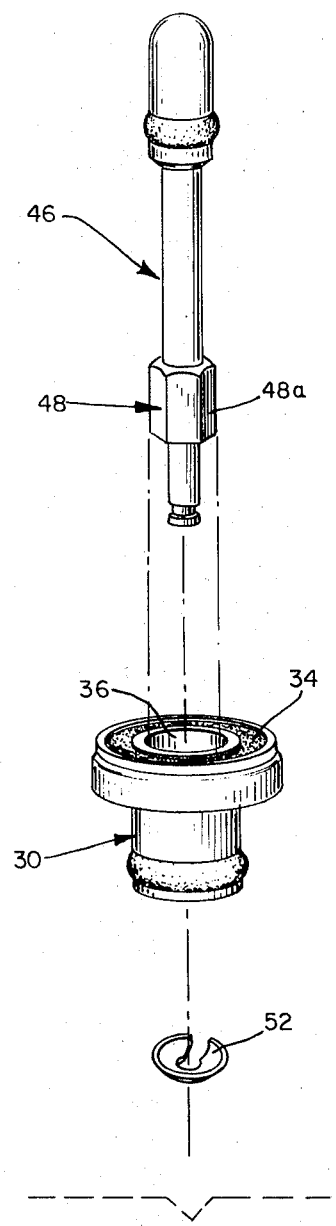
FIG. 5 is an exploded view of the valve member, valve stem assembly.
Figure 3:
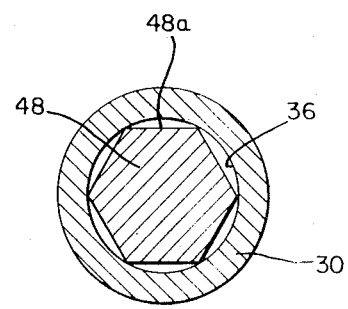
FIG. 3 is an enlarged sectional view taken on the line 3—3 of FIG. 2.
Figure 4:
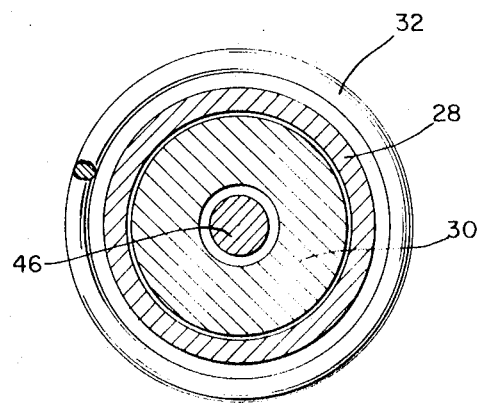
FIG. 4 is an enlarged sectional view taken on the line 4—4 of FIG. 2.

FIG. 5 shows an exploded view and it can be seen that irrespective of the angular orientation of the stem in the valve member, air will be able to pass along one of the sides 48a, for instance, of the enlarged hexagonal portion and that because the seating edge of the hexagonal portion is a plurality of straight lines, there will always be a leak path between that edge and the tapered circular portion 40. Moreover, because of the ample passage afforded by the leak path, pluggage of the path with dirt is not so likely as in prior art devices.

Because the ring 52 holds the stem firmly on the head, there is no longitudinal play of the stem relative to the valve member, which would otherwise cause a lag or hysteresis in operation and inaccuracies. Additionally, the stem valve member assembly may be easily taken apart by removing the bowed "E"-ring and slipping the stem pin 46 out of the bore in the valve member.

The invention may be described in the following claim language:

I claim:

1. A fluid pressure regulator comprising
   a. a housing having an inlet at one side and an outlet at the other, the outlet terminating within the housing in a downwardly facing annular seat, an annular upward guide wall in the housing below and aligned with said seat, the housing also containing a regulator spring and a pressure diaphragm communicating with the outlet, the diaphragm having a central vent port;
   b. a valve member having an upwardly facing annular sealing surface adapted to seal against said seat, the valve member having a downward piston extending into the guide in sealing relation, the valve member having an axial bore extending from the top to the bottom thereof and having three connected portions, an upper, wider portion and a lower, narrower portion, and a tapering portion intermediate the two, all portions being circular;
   c. a valve stem extending through the bore and upward therefrom into the outlet passage, the lower portion of the stem being of smaller diameter than the lower portion of the bore and the second portion of the stem, immediately above the lower portion, fitting snugly into the upper portion of the bore and having at least one flat side, the upper end of the stem normally blocking the vent port being urged downward by the regulator spring, and
   d. means removably but firmly attaching the stem and the valve member with the bottom of the upper portion of the stem shouldering on the tapered portion of the bore, the attaching means tightly engaging the bottom of the valve member, whereby downstream pressure communicates through the valve bore between the stem and the valve member to the chamber formed by the piston and guide to substantially balance the forces on the valve member, and the firm attachment of the stem and the valve permits accurate operation of the regulator and proper alignment with the vent port.

2. A fluid pressure regulator as described in claim 1 wherein the means attaching the stem and the valve member comprise the lower end of the stem being formed with a peripheral groove and a bowed "E"-ring engaging the groove to hold the stem firmly in the valve member.

3. A fluid pressure regulator as described in claim 1 wherein the second portion of the stem has an hexagonal periphery.

* * * * *